(12) United States Patent
Kuwaki et al.

(10) Patent No.: US 8,188,977 B2
(45) Date of Patent: May 29, 2012

(54) OPERATION INPUT DEVICE AND CHARACTER INPUT DEVICE

(75) Inventors: Osamu Kuwaki, Tokyo (JP); Munenori Shimada, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 358 days.

(21) Appl. No.: 12/512,158

(22) Filed: Jul. 30, 2009

(65) Prior Publication Data

US 2010/0045607 A1 Feb. 25, 2010

(30) Foreign Application Priority Data

Aug. 19, 2008 (JP) ................................. 2008-211223

(51) Int. Cl.
*G06F 3/02* (2006.01)
(52) U.S. Cl. ............. 345/169; 345/168; 341/21; 463/36
(58) Field of Classification Search .......... 345/168–169, 345/161; 341/21–23; 463/36–39
See application file for complete search history.

(56) References Cited

U.S. PATENT DOCUMENTS

| | | | | |
|---|---|---|---|---|
| 5,874,906 A | * | 2/1999 | Willner et al. .................. | 341/22 |
| 6,811,491 B1 | * | 11/2004 | Levenberg et al. ............. | 463/47 |
| 7,407,439 B1 | * | 8/2008 | Ochoa .............................. | 463/37 |
| 2005/0288098 A1 | | 12/2005 | Tse | |
| 2007/0021208 A1 | * | 1/2007 | Mao et al. ....................... | 463/36 |
| 2008/0284731 A1 | * | 11/2008 | Mak Pui See et al. ........ | 345/161 |

FOREIGN PATENT DOCUMENTS

| | | |
|---|---|---|
| EP | 1 475 688 | 11/2004 |
| JP | 2004-128669 | 4/2004 |

OTHER PUBLICATIONS

United Kingdom Search Report dated Dec. 10, 2009, from the corresponding United Kingdom Application.
Notice of Rejections dated Jul. 13, 2010, from the corresponding Japanese Application.
"Mini-wireless keyboard attachable to PS3 controller is on sale" ASCII.jp, ASCII Media Works Inc., dated Aug. 11, 2007, retrieved on May 26, 2010, from http://ascii.jp/elem/000/000/057/57240.

* cited by examiner

*Primary Examiner* — Kimnhung Nguyen
(74) *Attorney, Agent, or Firm* — Katten Muchin Rosenman LLP (57) ABSTRACT

Provided is an operation input device to be attached to a base having a recessed portion including a side surface that faces one end of the base. The operation input device includes: a side surface portion formed into a shape corresponding to the side surface of the recessed portion; and first and second holding portions which fix the operation input device to the base by sandwiching the base, in which: a surface of one of the holding portions, which contacts the base, is bent toward the other holding portion; a tip end portion of the first holding portion moves toward an opposite side to the second holding portion, whereby the operation input device is attached to or detached from the base; and the side surface portion contacts with the side surface of the recessed portion, when the operation input device is attached to the base.

4 Claims, 10 Drawing Sheets

OPERATION INPUT DEVICE AND CHARACTER INPUT DEVICE

BACKGROUND OF THE INVENTION

1. Field of the Invention

The present invention relates to an operation input device and a character input device to be used by being attached to a base.

2. Description of the Related Art

There are known various operation input devices used for receiving operation input from a user. Examples of operation input devices are a controller of a home game machine, a character input device including keys for character input, and the like. In cases where it is desired to use a plurality of the operation input devices as described above in combination with one another, or where it is desired to use a reduced size operation input device that is stably fixed etc, it is usually necessary for the operation input device be used in a state where it is attached to a base. (For example, the base described above may be another operation input device.)

SUMMARY OF THE INVENTION

In a case where the operation input device is used by being attached to the base, it is desirable to be able to easily attach and detached the operation input device to and from the base. However, if the operation input device is not sufficiently fixed to the base after initial to the base, a problem arises in that position of the operation input device is not stable, thereby making it difficult to perform operation input.

The present invention has been made in view of the above-described circumstances. It is an object of the present invention to provide an operation input device and a character input device, each of which includes a mechanism capable of easily attaching/detaching the operation input device to/from a base in the case where the operation input device is used by being attached to the base, and that can be sufficiently fixed to the base at the time of use.

In order to solve the above-mentioned problem, according to the present invention, there is provided an operation input device to be used by being attached to a base having a surface on which a recessed portion including a side surface that faces one end of the base is formed, the operation input device including: a side surface portion, at least a part of which is formed into a shape corresponding to the side surface of the recessed portion facing the one end; and first and second holding portions which protrude from the operation input device so as to be opposed to each other, and fix the operation input device to the base by sandwiching the base respectively from the one end and an opposite side to the one end, in which: a surface of at least one of the first and second holding portions, which is brought into contact with the base, is formed to be bent at a tip end portion thereof toward another one of the first and second holding portions; at least a tip end portion of the first holding portion is configured to be movable toward an opposite side to the second holding portion, with the tip end portion moving toward the opposite side to the second holding portion, whereby the operation input device is attached to or detached from the base; and the side surface portion is brought into contact with the side surface of the recessed portion facing the one end, in a state where the operation input device is attached to the base.

Further, a character input device according to the present invention is used by being attached to a base having a surface on which a recessed portion including a side surface that faces a one end of the base is formed, and includes: character inputting keys provided on a surface of the character input device; a side surface portion, at least a part of which is formed into a shape corresponding to the side surface of the recessed portion facing the one end; and first and second holding portions which protrude from the character input device so as to be opposed to each other, and fix the character input device to the base by sandwiching the base respectively from the one end and an opposite side to the one end, in which: a surface of at least one of the first and second holding portions, which is brought into contact with the base, is formed to be bent at a tip end portion thereof toward another one of the first and second holding portions; at least a tip end portion of the first holding portion is configured to be movable toward an opposite side to the second holding portion, and the tip end portion moves toward the opposite side to the second holding portion, whereby the character input device is attached to or detached from the base; and the side surface portion is brought into contact with the side surface of the recessed portion facing the one end, in a state where the character input device is attached to the base.

DETAILED DESCRIPTION OF THE INVENTION

A description is given below in detail of an embodiment of the present invention, based on the drawings.

Figure 1A:
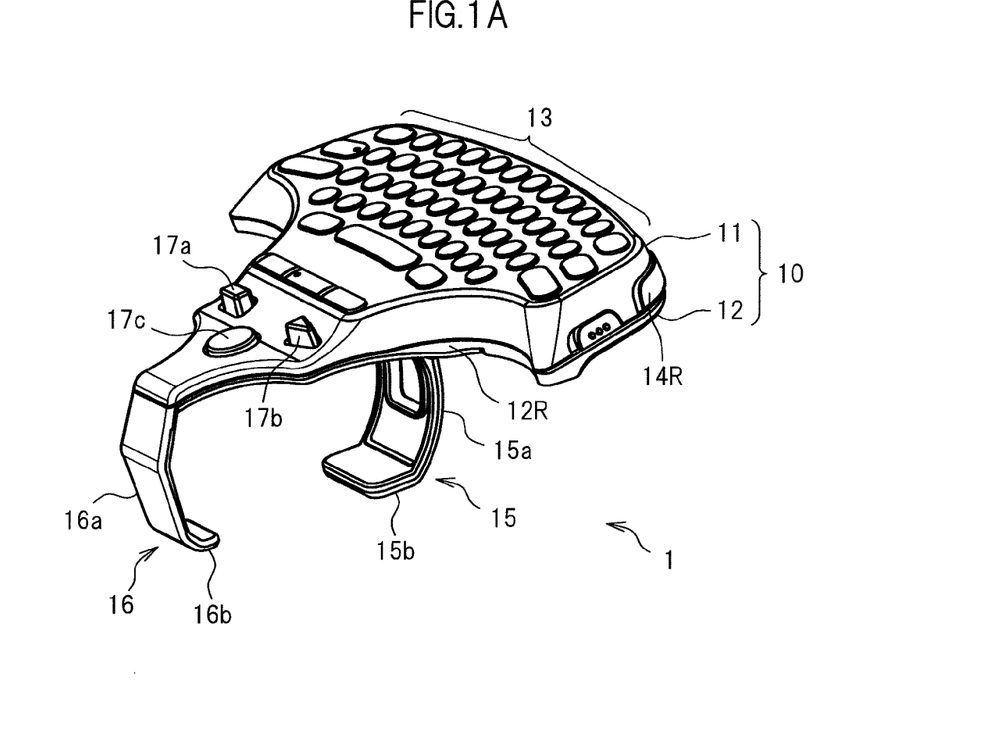
FIGS. 1A and 1B are perspective views of a key pad that functions as an operation input device.
Figure 1B:
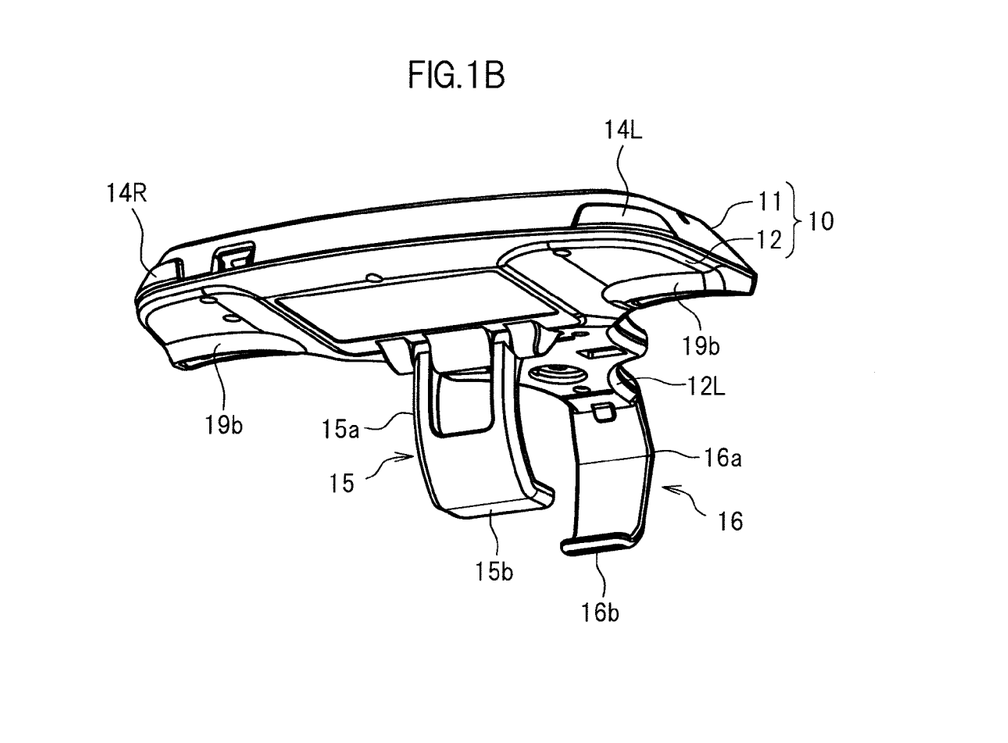
Figure 2:
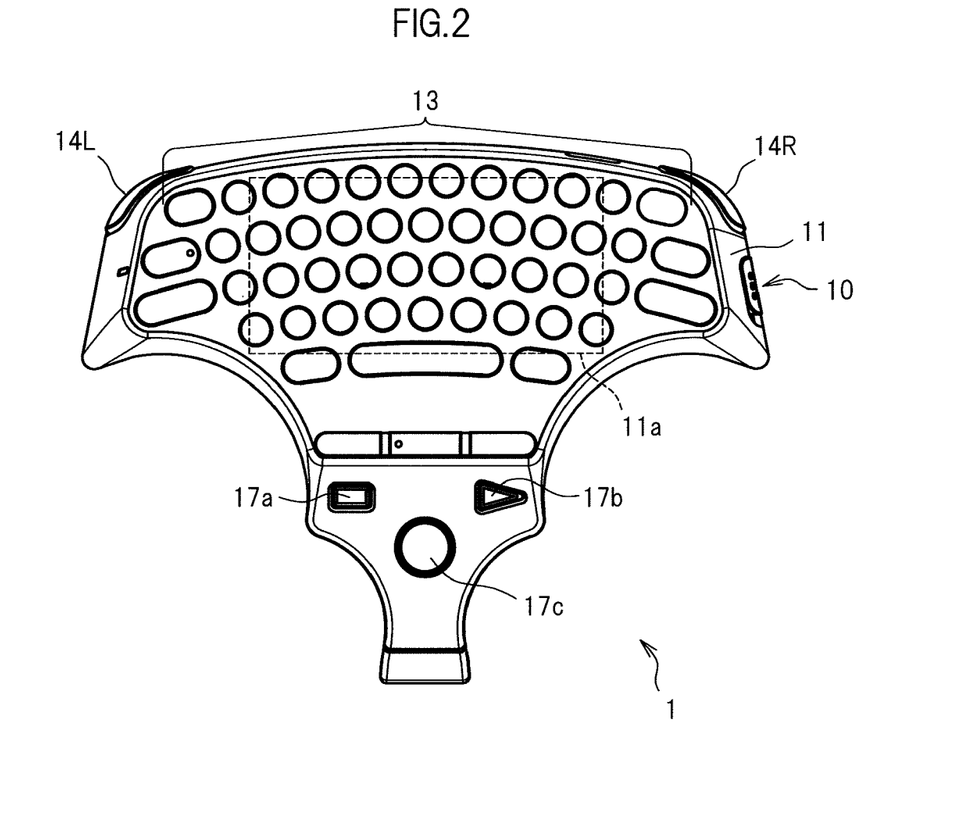
FIG. 2 is a plan view of the key pad.
Figure 3:
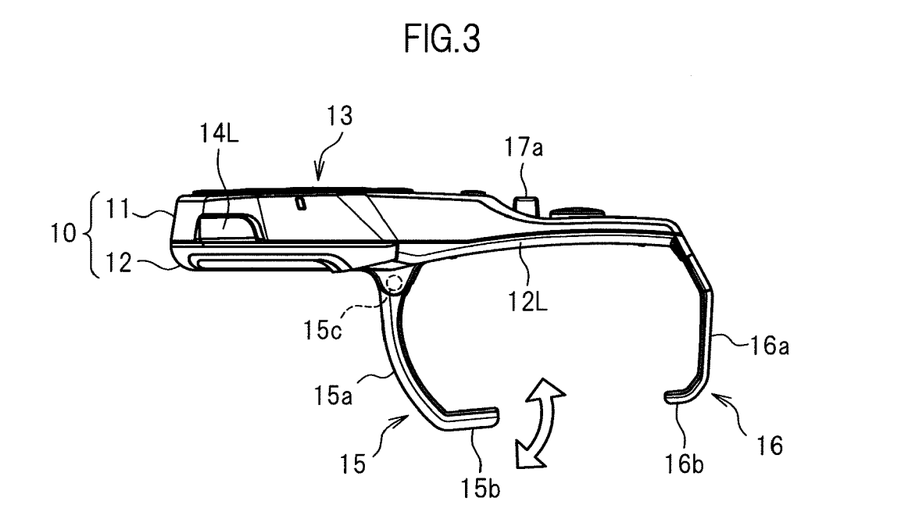
FIG. 3 is a side view of the key pad.

FIGS. 1A and 1B are perspective views illustrating an exterior appearance of a key pad 1 as an example of an operation input device according to the embodiment of the present invention. Further, FIG. 2 is a plan view illustrating a state where the key pad 1 is viewed from above, and FIG. 3 is a left side view illustrating a state where the key pad 1 is viewed from the left side.

As illustrated in those drawings, when viewed from above, a body portion 10 of the key pad 1 has a shape in which a substantially rectangular portion and a substantially reverse triangular portion located on a forward side thereof are integrally coupled to each other. Further, the body portion 10 has a substantially flat shape as a whole, and a casing thereof includes a key arrangement portion 11 on an upper side (upper surface side) and a bottom portion 12 on a lower side (bottom surface side). Further, as illustrated in FIG. 2, with regard to an outer periphery of the body portion 10, which is formed into the reverse triangular shape, each of left and right sides thereof are formed into, instead of a straight shape, a curved shape in which two circular arcs are combined with each other. Accordingly, left and right side surface portions 12R and 12L of the bottom portion 12, which correspond to the above-mentioned curved portion, are also formed into curved surfaces curved into a circular arc shape.

A plurality of keys 13, including character keys for use in character input, are arrayed on an upper surface of the key arrangement portion 11. In this embodiment, a user performs operation input for the character keys, and can thereby input characters. Specifically, the key pad 1 functions as the character input device. Further, a key 14R and a key 14L are also arranged on side surfaces of the key arrangement portion 11. Those keys 14R and 14L are arranged so as to be located on both left and right ends of the key arrangement portion 11 when the key arrangement portion 11 is viewed from a rear surface (upper side of FIG. 2) thereof. Further, each of those keys 14R and 14L is arranged over a right or left side surface of the key arrangement portion 11, being side surfaces adjacent to the rear surface thereof. The keys 14R and 14L may be auxiliary keys used in combination with the plurality of keys 13 provided on the upper surface of the key arrangement portion 11. For example, the user operates one of the auxiliary keys together with one of the character keys arranged on the upper surface of the key arrangement portion 11, or operates the character key subsequently with the auxiliary key, and can thereby input a variety of characters by using the key pad 1.

Further, a touch sensor 11a is provided on the surface of the key arrangement portion 11, so as to overlap a range where the plurality of keys 13 are provided, and is capable of sensing that the fingers of the user touch the key arrangement section 11. The user operates a predetermined key among the keys 13, and can thereby switch between a mode of using the keys 13 and a mode of using the touch sensor 11a. In the mode of using the touch sensor 11a, the user can perform a variety of operation inputs by running their finger along a region on which the keys 13 are provided, from above.

Further, from the bottom surface of the body portion 10, a first holding portion 15 and a second holding portion 16 are provided in a protruding manner. Both of the first holding portion 15 and the second holding portion 16 are formed into a substantially L shape when viewed from side surfaces thereof, and are arranged opposite to each other so that tip ends of such L-shaped portions can face each other.

Specifically, the first holding portion 15 includes an arm portion 15a coupled to the bottom surface of the body portion 10, and a hook portion 15b bent from a tip end of the arm portion 15a and extended in a direction substantially perpendicular to the arm portion 15a. In a similar way, the second holding portion 16 includes an arm portion 16a coupled to the bottom surface of the body portion 10, and a hook portion 16b bent from a tip end of the arm portion 16a and extended in a direction substantially perpendicular to the arm portion 16a. Here, the hook portion 15b is bent from the arm portion 15a in a direction toward the second holding portion 16, and the hook portion 16b is bent from the arm portion 16a in a direction toward the first holding portion 15. Specifically, a surface of the first holding portion 15, the surface facing the second holding portion 16, is formed to be bent toward the second holding portion side at the tip end portion of the first holding portion 15. Further, a surface of the second holding portion 16, the surface facing the first holding portion 15, is also formed to be bent toward the first holding portion side at the tip end portion of the second holding portion 16.

Here, the second holding portion 16 and the body portion 10 are formed integrally with each other, and the arm portion 16a is erected substantially perpendicularly on the bottom surface of the body portion 10 downward from the forward-side end portion of the body portion 10. Accordingly, the hook portion 16b bent from the tip end of the arm portion 16a is extended substantially parallel to the bottom surface of the body portion 10, and is adapted so as not to move in a fore-and-aft direction. However, the hook portion 16b may move in the fore-and-aft direction within a range of being deformable by elasticity of the second holding portion 16 itself.

Meanwhile, the first holding portion 15 is formed of a separate member from the body portion 10, and is coupled to a position of the bottom surface of the body portion 10, which is in the vicinity of a center thereof. A rotation shaft 15c is provided on a portion of the arm portion 15a that is coupled to the body portion 10. The rotation shaft 15c is disposed in a direction that is parallel to the bottom surface of the body portion 10 and substantially perpendicular to a direction from the first holding portion 15 to the second holding portion 16. As illustrated by an arrow in FIG. 3, the first holding portion 15 is adapted to be rotatable with respect to the body portion 10 about the rotation shaft 15c taken as a rotation center. In such a way, the hook portion 15b of the first holding portion 15 is adapted to be movable in the fore-and-aft direction (that is, a direction of approaching the hook portion 16b of the second holding portion 16 and a direction of moving away from the hook portion 16b). Note that a detailed description is given later of a structure of such a connected portion of the first holding portion 15 and the body portion 10.

Next, a description is given of a shape of a controller 2 that functions as a base to which the key pad 1 is attached in this embodiment.

Figure 4:
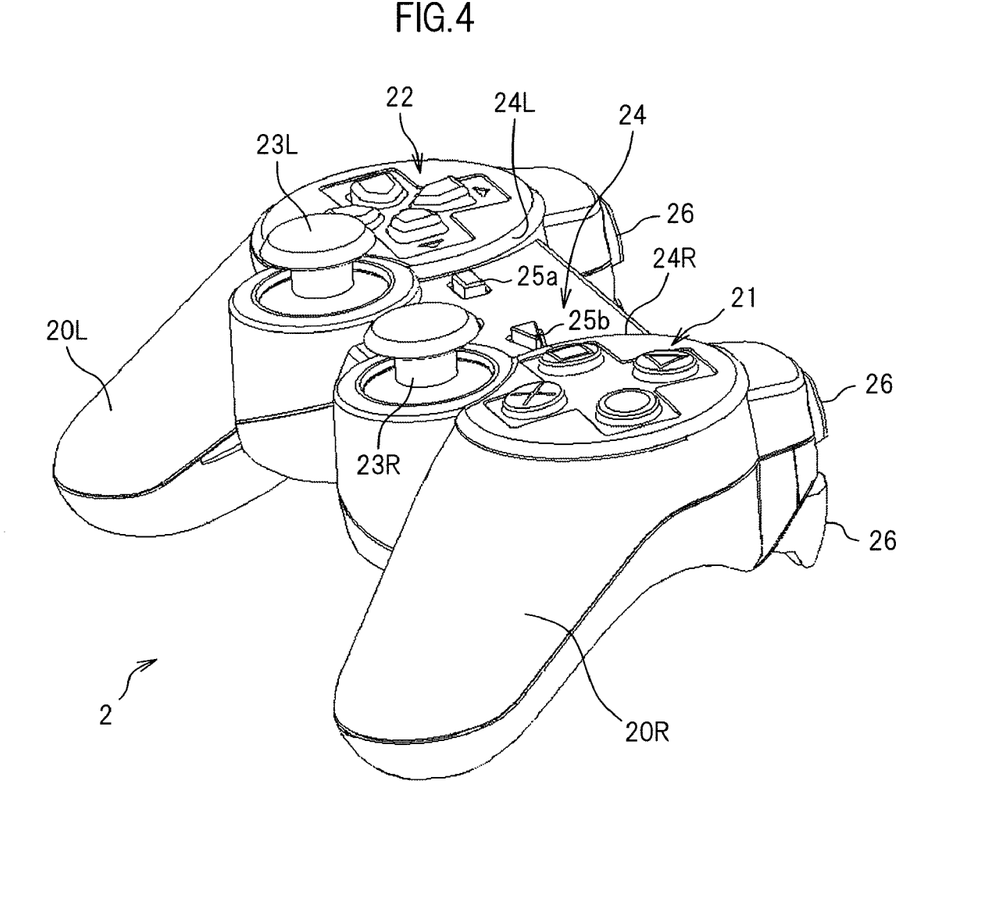
FIG. 4 is a perspective view of a controller that functions as a base.
Figure 5:
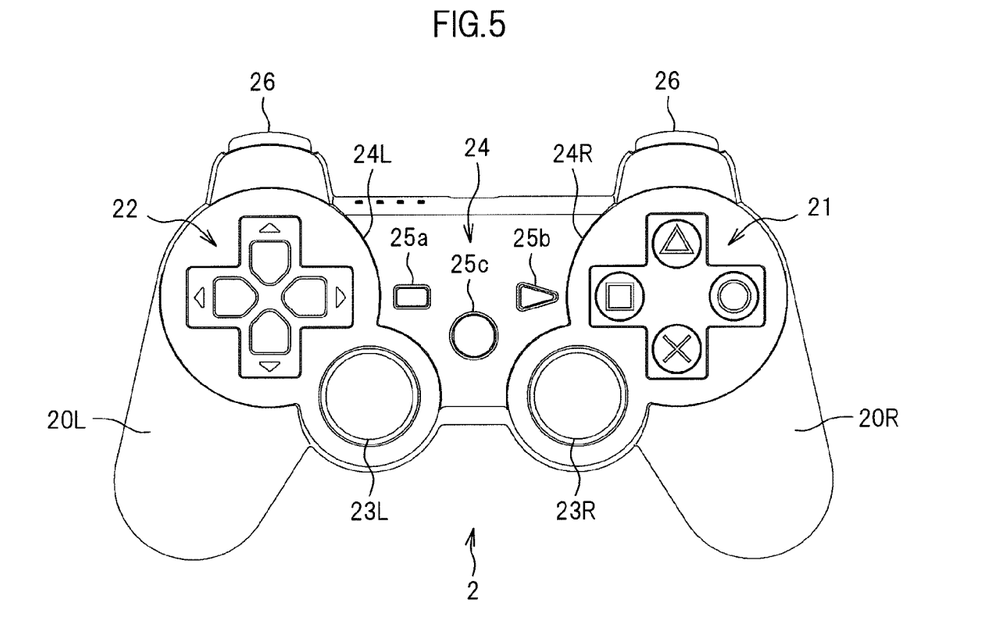
FIG. 5 is a plan view of the controller.
Figure 6:
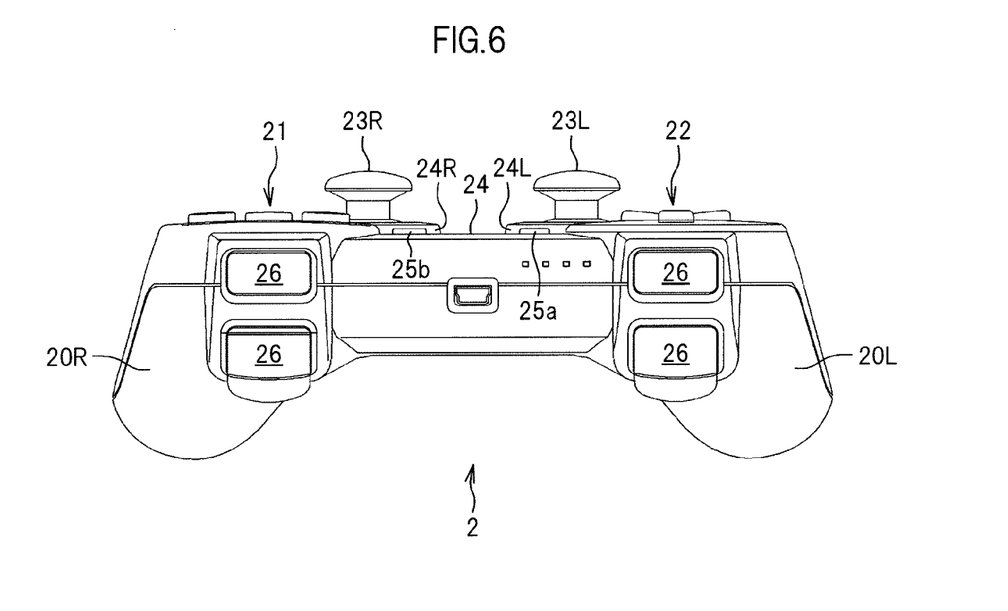
FIG. 6 is a rear view of the controller.

FIG. 4 is a perspective view illustrating an exterior appearance of the controller 2. Further, FIG. 5 is a plan view illustrating a state where the controller 2 is viewed from above. Further, FIG. 6 is a rear view illustrating a state where the controller 2 is viewed from a rear side.

As illustrated in those drawings, the controller 2 includes grip portions 20R and 20L protruding toward a forward side from left and right sides of an oblong body portion thereof. The user uses the controller 2 by gripping those grip portions 20 with the left and right hands.

At a position on a right side of an upper surface of the controller 2, the position being operable by the right thumb of the user in a state where the user grips the grip portion 20R in the right hand, there are provided a first operation portion 21 on which a plurality of buttons are provided, and an analog operation portion 23R. Further, at a position on a left side of an upper surface of the controller 2, the position being operable by the left thumb of the user in a state where the user grips the grip portion 20L in the left hand, there are provided a second operation portion 22 on which a plurality of buttons are provided, and an analog operation portion 23L. The user depresses the respective buttons provided on the first operation portion 21 and the second operation portion 22, and tilts the analog operation portions 23R and 23L, and can thereby execute a variety of operation inputs by using the controller 2.

Here, each of the first operation portion 21, the second operation portion 22, the analog operation portion 23R, and the analog operation portion 23L are arranged on a substantially circular region on the upper surface of the controller 2. Here, the substantially circular regions bulge out with respect to a region in the vicinity of a center of the upper surface of the controller 2. On the contrary, on a center portion of the upper surface of the controller 2 which excludes those four circular regions, a recessed portion 24 that is relatively lower in height than the four circular regions is formed. In such a way, a step difference is formed on a boundary portion between the recessed portion 24 and a region where the first operation portion 21 and the analog operation portion 23R are provided, and a curved side surface 24R in which two circular arcs are combined with each other is formed. In a similar way, a side surface 24L symmetrical to the side surface 24R is formed on a boundary portion between the recessed portion 24 and a region where the second operation portion 22 and the analog operation portion 23L are provided. Both of those side surfaces 24R and 24L of the recessed portion 24 face one end (the rear side of the base, in this embodiment) of an outer periphery of the upper surface of the controller 2. Further, the recessed portion 24 opens toward the one end. Accordingly, as illustrated in FIG. 6, the side surfaces 24R and 24L of the recessed portion 24 are exposed when viewed from a direction of the one end.

Further, buttons 25a, 25b and 25c are arranged in the recessed portion 24 on the upper surface of the controller 2. Further, a plurality of buttons 26 are also arranged at positions on the rear surface of the controller 2 illustrated in FIG. 6, the positions being operable, for example, by the index fingers of both hands in a state where the user grips the respective grip portions 20R and 20L with the right and left hands. Those buttons may also be used for the operation inputs by the user.

In this embodiment, both of the key pad 1 and the controller 2 function as the operation input devices which receive the operation inputs from the user and output contents of the operation inputs to an information processing apparatus (for example, a home game machine and the like). Specifically, the key pad 1 and the controller 2 are connected to the information processing apparatus independently of each other by a communication interface according to the Bluetooth (registered trademark) standard or the like. Then, the key pad 1 transmits information regarding operation contents of the user, which include the depression of the respective keys 13 and the keys 14R and 14L, to the information processing apparatus, and the controller 2 transmits information regarding operation contents of the user, which include the depression of the respective buttons, the tilting of the analog operation portions 23R and 23L, and the like, to the information processing apparatus.

Further, the key pad 1 is used in the state of being attached to the controller 2 as described above. Specifically, a partial region of a bottom surface of the key pad 1 is superposed on a partial region of the upper surface of the controller 2, and the first holding portion 15 and the second holding portion 16, which protrude from the bottom surface of the key pad 1, sandwich side surfaces of the controller 2 from the rear side and the opposite side thereto (that is, the front side), thus fixing the key pad 1 to the controller 2.

Figure 7A:
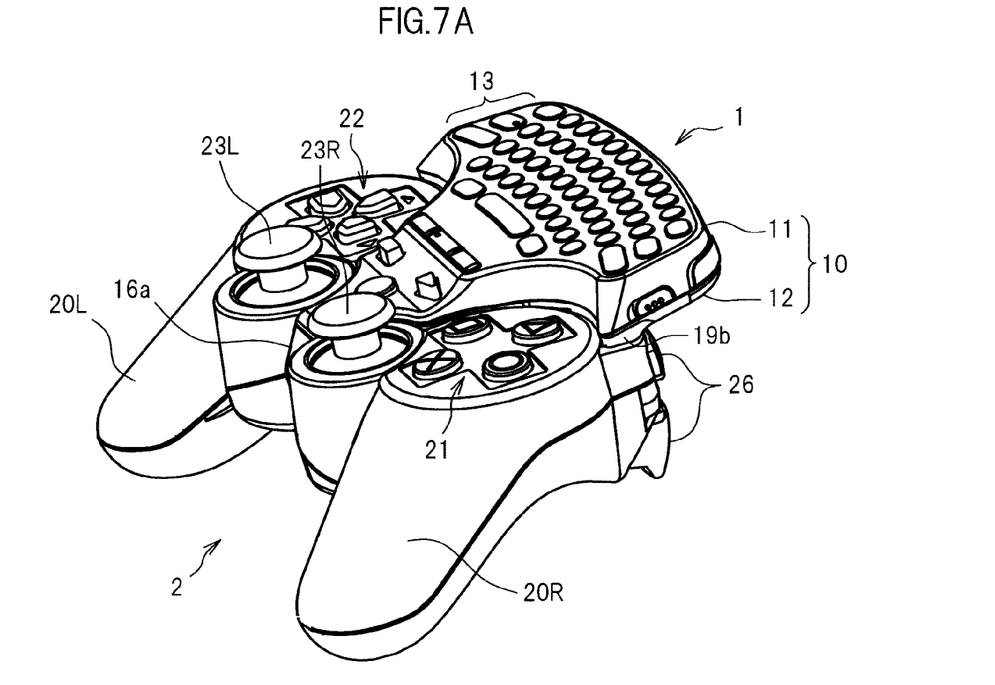
FIGS. 7A and 7B are perspective views of a state where the key pad is attached to the controller.
Figure 7B:
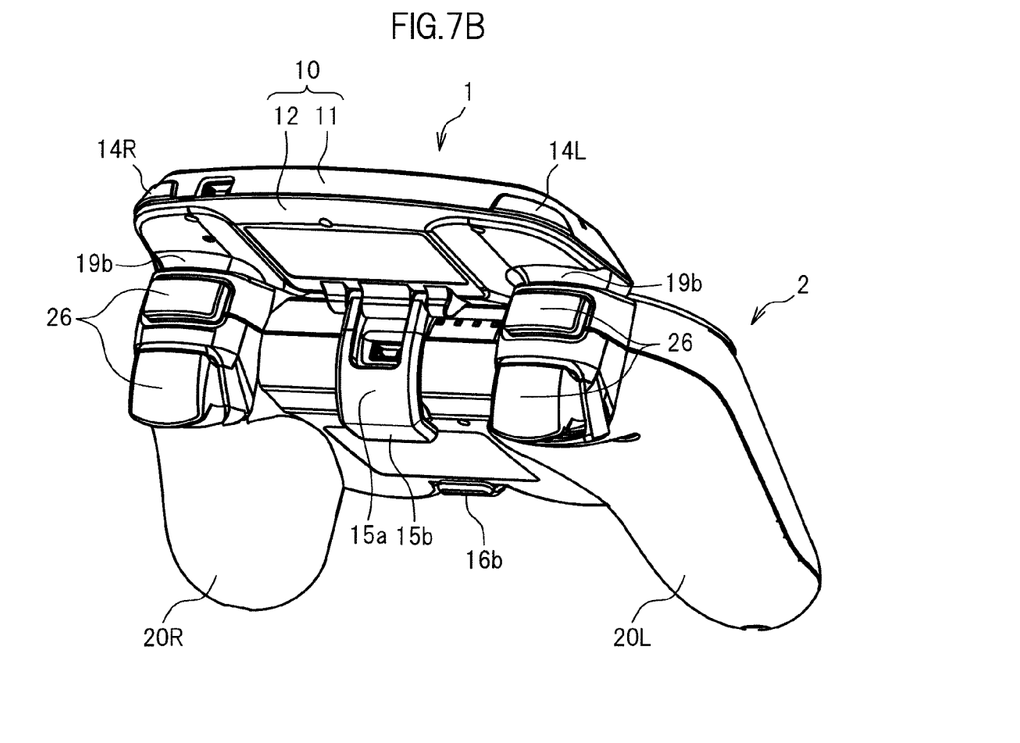
Figure 8:
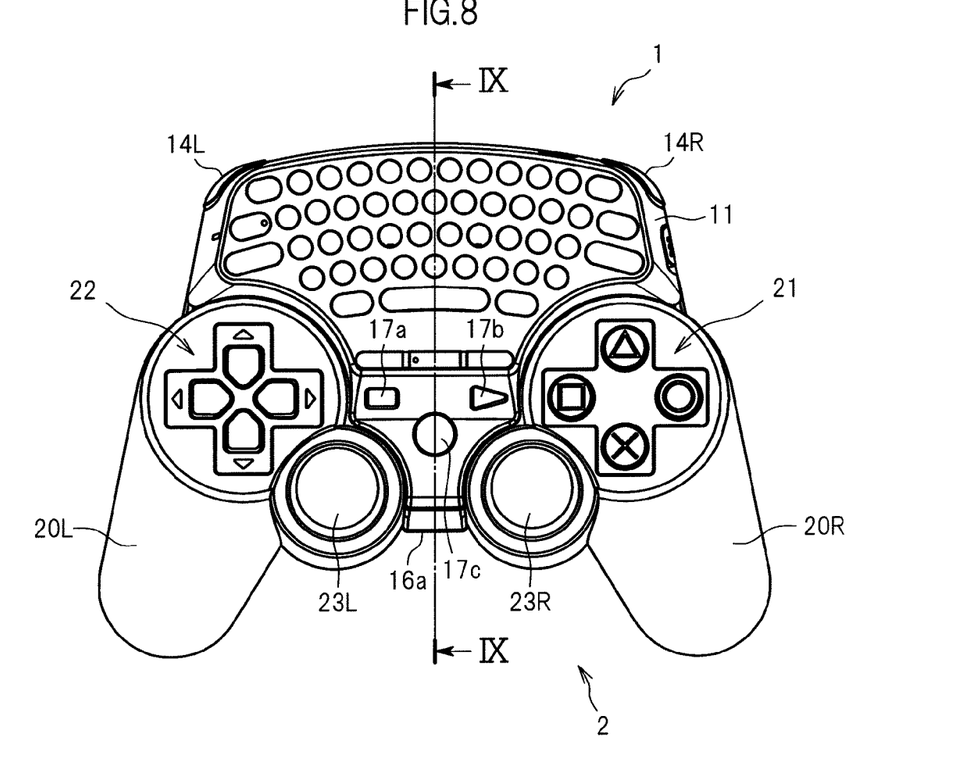
FIG. 8 is a plan view of the state where the key pad is attached to the controller.
Figure 9:
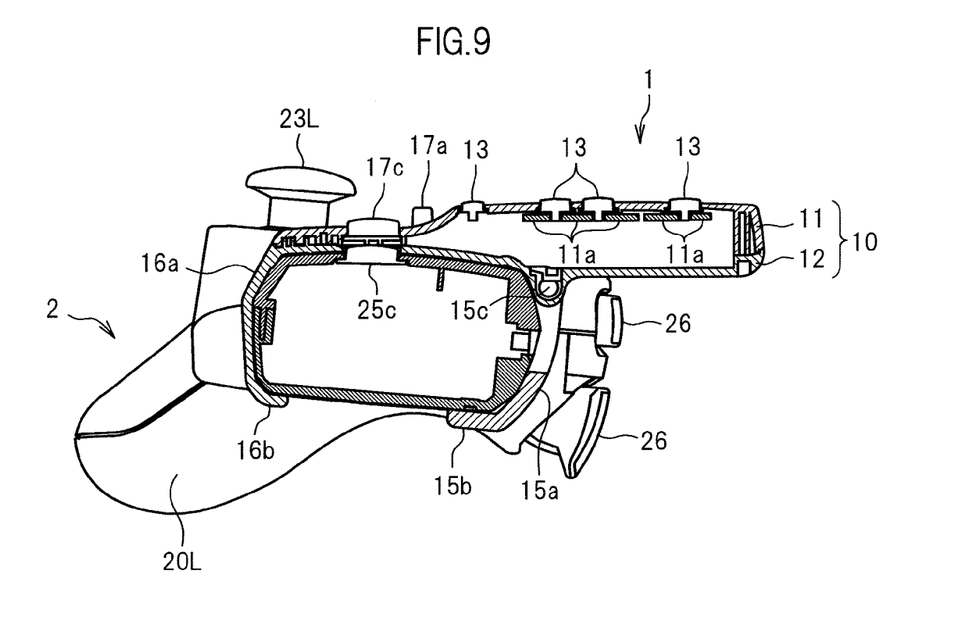
FIG. 9 is a cross-sectional view of the state where the key pad is attached to the controller.

Both of FIGS. 7A and 7B are perspective views illustrating a state where the key pad 1 is attached to the controller 2. Further, FIG. 8 is a plan view illustrating a state where the key pad 1 and the controller 2 in this state are viewed from above. Further, FIG. 9 is a cross-sectional view illustrating a state where the key pad 1 and the controller 2 are cut along a centerline (IX-IX line in FIG. 8) thereof in a left-to-right direction. In such a state where the key pad 1 is attached to the controller 2 as described above, while gripping the grip portions 20R and 20L of the controller 2 with both hands, the user can execute operation inputs that are made by depressing the keys 13 arrayed on the upper surface of the key pad 1 with the thumbs, and depressing the keys 14R and 14L provided on the side surfaces thereof with the index fingers. Alternatively, while gripping one of the grip portions 20R and 20L with one hand, the user can operate the keys 13 and the like with the fingers of the other hand. Further, in a state where the key pad 1 is attached to the controller 2, the user can also operate not only the keys provided on the key pad 1 but also a variety of buttons provided on the controller 2, the analog operation portions 23R and 23L and the like while gripping the grip portions 20R and 20L. For example, while gripping the grip portions 20R and 20L with the palms and little fingers of both hands, the user can operate the keys 14R and 14L of the key pad 1 with the index fingers, the buttons 26 of the rear surface of the controller 2 with the middle fingers and the ring fingers of both hands, and further, the first operation portion 21, second operation portion 22, analog operation portion 23R, and analog operation portion 23L of the controller 2, and the keys 13 of the key pad 1 with the thumbs.

Note that as illustrated in those drawings, the key pad 1 is attached to the controller 2 in such a manner that the portion of the bottom surface of the key pad 1, which is formed into the reverse triangular shape, is superposed on the region of the controller 2, on which the recessed portion 24 is formed. Accordingly, the buttons 25a, 25b and 25c provided in the recessed portion 24 are covered with the key pad 1 and hidden behind the key pad 1. Therefore, on the upper surface of the key pad 1, separately from the plurality of keys 13, buttons 17a, 17b, and 17c are arranged at positions corresponding to upper portions of the buttons 25a, 25b, and 25c, respectively, when the key pad 1 is attached to the controller 2. Connecting members which penetrate the body portion 10 of the key pad 1 and extend to the bottom surface thereof are connected to back sides of those respective buttons 17a, 17b, and 17c. The user depresses the respective buttons 17a, 17b, and 17c, thus pushing the connecting members, that are connected to the depressed buttons, downward. In response to such an operation, the buttons 25a, 25b, and 25c, corresponding to tip end portions of the connecting members are depressed. In such a way, the user can also respectively operate the buttons 25a, 25b, and 25c of the controller 2, which are hidden when the key pad 1 is attached, through the buttons 17a, 17b, and 17c provided on the key pad 1.

A description will be given below, in detail, of a mechanism of attaching and fixing the key pad 1 to the controller 2.

As described above, both of the first holding portion 15 and the second holding portion 16 are formed into a substantially L shape. Accordingly, when the casing of the controller 2 is sandwiched by those holding portions, the hook portions 15b and 16b provided on the tip end portions of the respective holding portions go around to the bottom surface side of the controller 2. Here, each of the arm portions 15a and 16a is formed to have a length corresponding to a thickness of the controller 2. Specifically, both of the first holding portions 15 and the second holding portions 16 are adapted to sandwich the side surfaces of the controller 2 from spots of the recessed portion 24 of the controller 2, which are open toward the outer periphery of the upper surface of the controller 2. Accordingly, the length of each of the arm portions 15a and 16a becomes shorter than a thickness of the body portion of the controller 2 by a depth of the recessed portion 24. In such a way, when the key pad 1 is attached to the controller 2, the hook portions 15b and 16b are brought into contact with the bottom surface of the controller 2, and fix the key pad 1 to the controller 2 so that the key pad 1 cannot positionally shift with respect to the controller 2 in the up-and-down direction.

Note that as illustrated in FIG. 9, in a range of the controller 2, which is held by the first holding portion 15 and the second holding portion 16, spots of the casing of the controller 2, which continue from the side surfaces thereof to the bottom surface thereof, are formed not to be squarely bent but to be gently bent in a rounded manner. Accordingly, when a length of the hook portions 15b and 16b is short, the hook portions 15b and 16b do not completely go around to the bottom surface of the controller 2, and the key pad 1 becomes prone to positionally shift in the up-and-down direction. Accordingly, in this embodiment, in order to prevent such a positional shift, the hook portions 15b and 16b are formed to have a length sufficient for fixing the key pad 1 to the controller 2 by going around to spots of the bottom surface portion of the controller 2, which is parallel to the upper surface thereof. According to the above-mentioned construction, at the time when the user performs such operation input of depressing the keys arranged on the upper surface of the key pad 1, the key pad 1 does not positionally shift with respect to the controller 2 in the up-and-down direction, and so the key pad 1 can be used stably.

The hook portions 15b and 16b are formed to have the required length as described above. Accordingly, in the state where the key pad 1 is attached to the controller 2, a distance between a tip end portion of the hook portion 15b and a tip end portion of the hook portion 16b is shorter than a length of a sandwiched portion of the controller 2 in the fore-and-aft direction. However, if the first holding portion 15 and the second holding portion 16 are always fixed in this state, then the body of the controller 2 cannot be inserted into a space sandwiched by the first holding portion 15 and the second holding portion 16, and it becomes difficult to attach the key pad 1 to the controller 2. Therefore, in this embodiment, as described above, at least the hook portion 15b of the first holding portion 15 is formed to be movable toward an opposite side to the second holding portion 16.

Specifically, the entirety of the first holding portion 15 rotates about the rotation shaft 15c taken as the rotation center in the direction in which the hook portion 15b moves away from the second holding portion 16, thus increasing the distance from the tip end portion of the hook portion 15b to the tip end portion of the hook portion 16b, and the controller 2 becomes insertable therebetween. Thereafter, the first holding portion 15 rotates in a reverse direction (direction in which the hook portion 15b approaches the second holding portion 16), thus fixing the key pad 1 to the controller 2 while sandwiching the controller 2. Note that in order to stably fix the key pad 1 to the controller 2 at this time, the first holding portion 15 is urged by an elastic member such as a spring so as to receive force such that the first holding portion 15 rotates in the direction of approaching the second holding portion 16. Note that at the time of detaching the key pad 1 from the controller 2 also, the first holding portion 15 is rotated in the direction of moving away from the second holding portion 16 in a similar way, as a result of which the key pad 1 can be easily detached from the controller 2.

Figure 10:
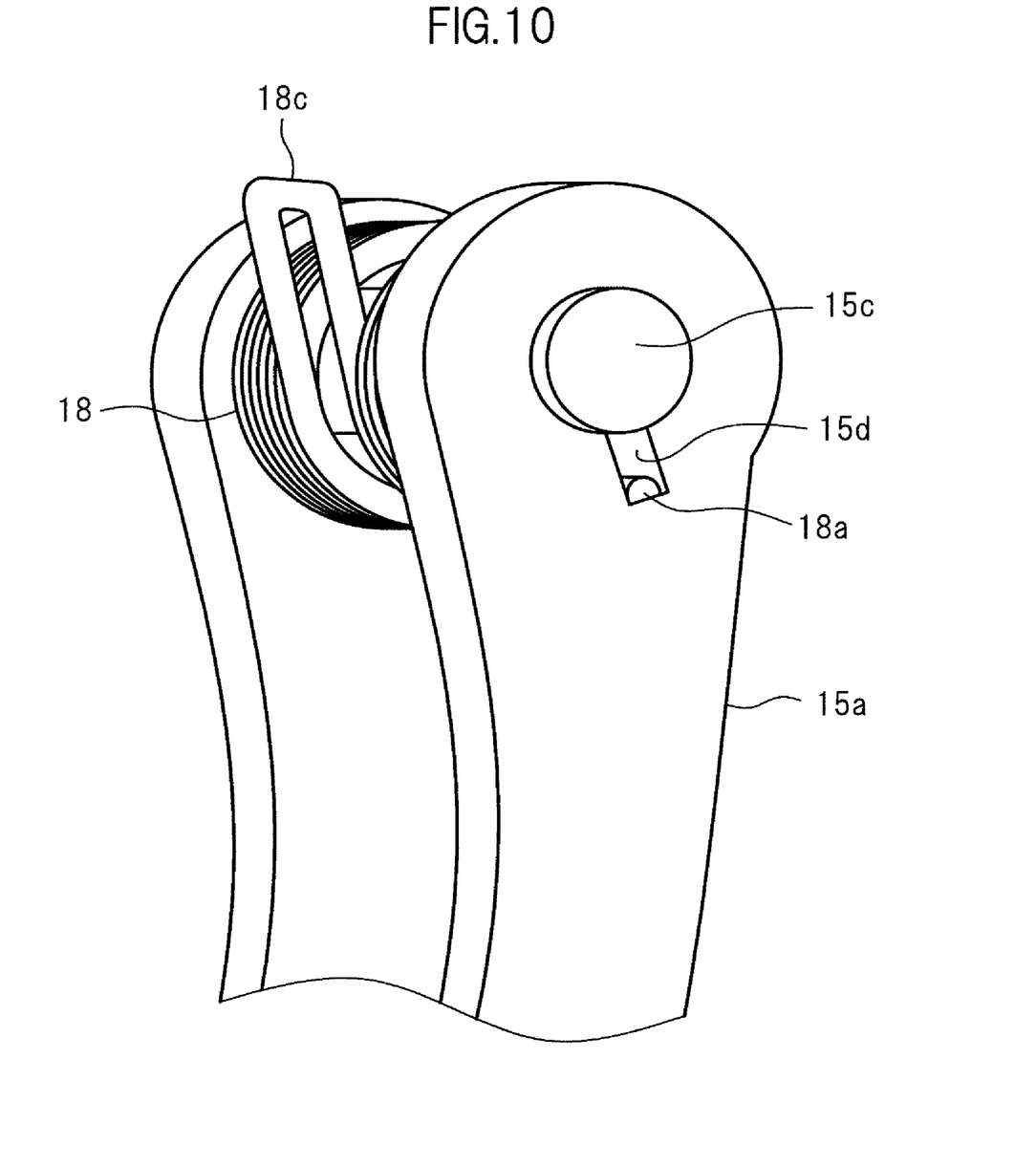
FIG. 10 is a partially enlarged view of a first holding portion.
Figure 11:
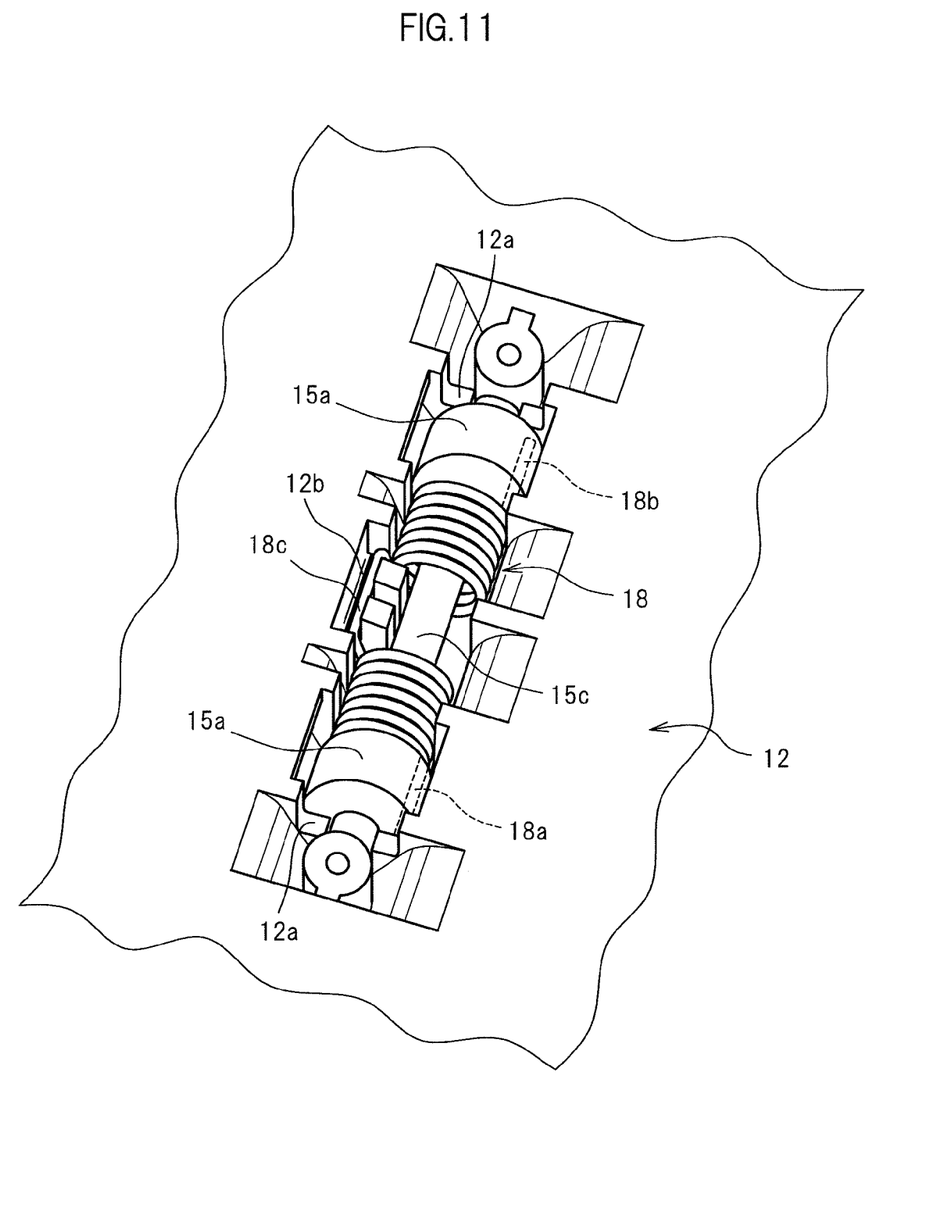
FIG. 11 is a view illustrating a connected portion of the first holding portion to a bottom portion of the key pad.

FIG. 10 and FIG. 11 are views for describing such a rotation mechanism of the first holding portion 15. Specifically, FIG. 10 is an enlarged view where a portion of the first holding portion 15, which is connected to the bottom portion 12, is enlarged. Further, FIG. 11 is an enlarged view illustrating a spot, to which the first holding portion 15 is connected, inside the bottom portion 12, which is obtained by separating the upper-side key arrangement portion 11 from the body portion 10.

As illustrated in FIG. 10, as an elastic member for rotating the first holding portion 15 in the direction in which the hook portion 15b approaches the second holding portion 16, a helical coil spring 18 is disposed coaxially with the rotation shaft 15c of the first holding portion 15. A tip end portion 18a of the helical coil spring 18 is inserted into a groove 15d provided in the arm portion 15a. Note that although only the tip end portion 18a as one end of the helical coil spring 18 is illustrated in FIG. 10, a tip end portion 18b as the other end thereof is also inserted into a groove provided on an opposite side to the groove 15d of the arm portion 15a in a similar way. Further, on a portion of the helical coil spring 18, which is in the vicinity of a center thereof, a bent portion 18c that has a substantially U shape is formed, as illustrated.

Further, as illustrated in FIG. 11, a bearing portion 12a is formed on the bottom portion 12, and the rotation shaft 15c of the first holding portion 15 is disposed on the bearing portion 12a so as not to come away from the bottom portion 12. However, since the rotation shaft 15c is not adhered onto the bearing portion 12a, the first holding portion 15 is adapted to rotate freely with respect to the bottom portion 12 about the rotation shaft 15c taken as the rotation center. Further, the bent portion 18c of the helical coil spring 18 is hooked in and fixed to a groove 12b provided in the bottom portion 12. In such a way, the helical coil spring 18 applies force to the first holding portion 15 so that the first holding portion 15 rotates toward the direction in which the hook portion 15b of the first holding portion 15 approaches the second holding portion 16. At this time, the helical coil spring 18 operates while using a position of the bent position 18c as a fulcrum and using the tip end portions 18a and 18b thereof as points of application.

In a state where the key pad 1 is not attached to the controller 2, and the user does not touch the first holding portion 15, the first holding portion 15 rotates by a function of the helical coil spring 18 to a position where the tip end portion of the hook portion 15b thereof is brought into contact with the bottom surface of the body portion 10 of the key pad 1. However, the first holding portion 15 is connected to the bottom portion 12 so as to be bidirectionally freely rotatable with respect thereto as described above. Accordingly, the user manually pulls the first holding portion 15, and so on, thereby rotating the first holding portion 15 with ease in a direction reverse to the direction in which the first holding portion 15 is urged by the helical coil spring 18. Then, in a state where the hook portion 15b thus moves in the direction of moving away from the second holding portion 16, the controller 2 is inserted between the first holding portion 15 and the second holding portion 16, and thereafter, the hand is released from the first holding portion 15. In such a way, the first holding portion 15 is thrust against the controller 2 by the elastic force of the helical coil spring 18, and the hook portion 15b holds the bottom surface of the controller 2, and fixes the key pad 1 to the controller 2.

As described above, the first holding portion 15 is formed so as to rotate freely with respect to the body portion 10. In such a way, though the force to urge the first holding portion 15 in the direction of pressing the controller 2 is applied thereto, the user can manually pull and rotate the first holding portion 15, and can thereby attach and detach the key pad 1 to and from the controller 2 with ease. However, in the case where such a rotation mechanism is adopted, when force to pull the key pad 1 to the forward side is applied thereto after the key pad 1 is attached to the controller 2, the first holding portion 15 attempts to rotate to the opposite side to the second holding portion 16 side, and there is a fear that the key pad 1 may shake in the fore-and-aft direction. In particular, in this embodiment, since the keys 14R and 14L are arranged on the rear surface side of the key pad 1, force to push the key pad 1 to the forward side is applied thereto when the user depresses those keys, and there is a fear that the key pad 1 may shake in the fore-and-aft direction during use.

Figure 12:
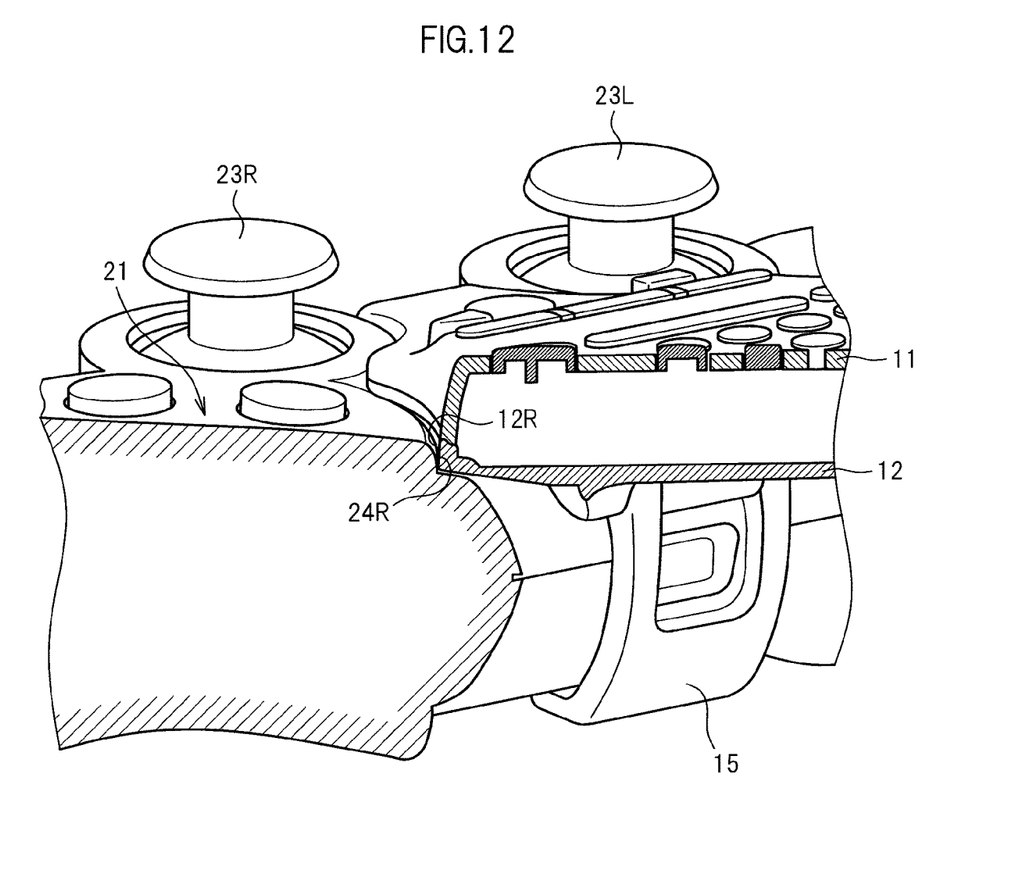
FIG. 12 is a partial cross-sectional view of the state where the key pad is attached to the controller.

Accordingly, in this embodiment, for the purpose of preventing the key pad 1 from shaking as described above, the side surface portions 12R and 12L of the bottom portion 12 are adapted to be brought into contact with the side surfaces 24R and 24L provided on the recessed portion 24 of the controller 2 in the state where the key pad 1 is attached to the controller 2. For the purpose of realizing such a construction, as understood from FIG. 8, the side surface portions 12R and 12L are formed into shapes corresponding to those of the side surfaces 24R and 24L of the recessed portion 24. As described above, the side surfaces 24R and 24L faces the rear side of the controller 2. Accordingly, even if the force in the direction of moving the key pad 1 to the forward side with respect to the controller 2 is applied to the key pad 1, the side surface portions 12R and 12L are regulated by the side surfaces 24R and 24L of the recessed portion 24, as a result of which the key pad 1 no longer moves with respect to the controller 2. FIG. 12 is a partial cross-sectional view illustrating such a state where the side surface portion 12R is brought into contact with the side surface 24R of the recessed portion 24 as described above. Note that as illustrated in this drawing, not the whole of the side surface portions 12R and 12L but only partial regions may be brought into contact with the side surface 24R and the side surface 24L.

Figure 13:
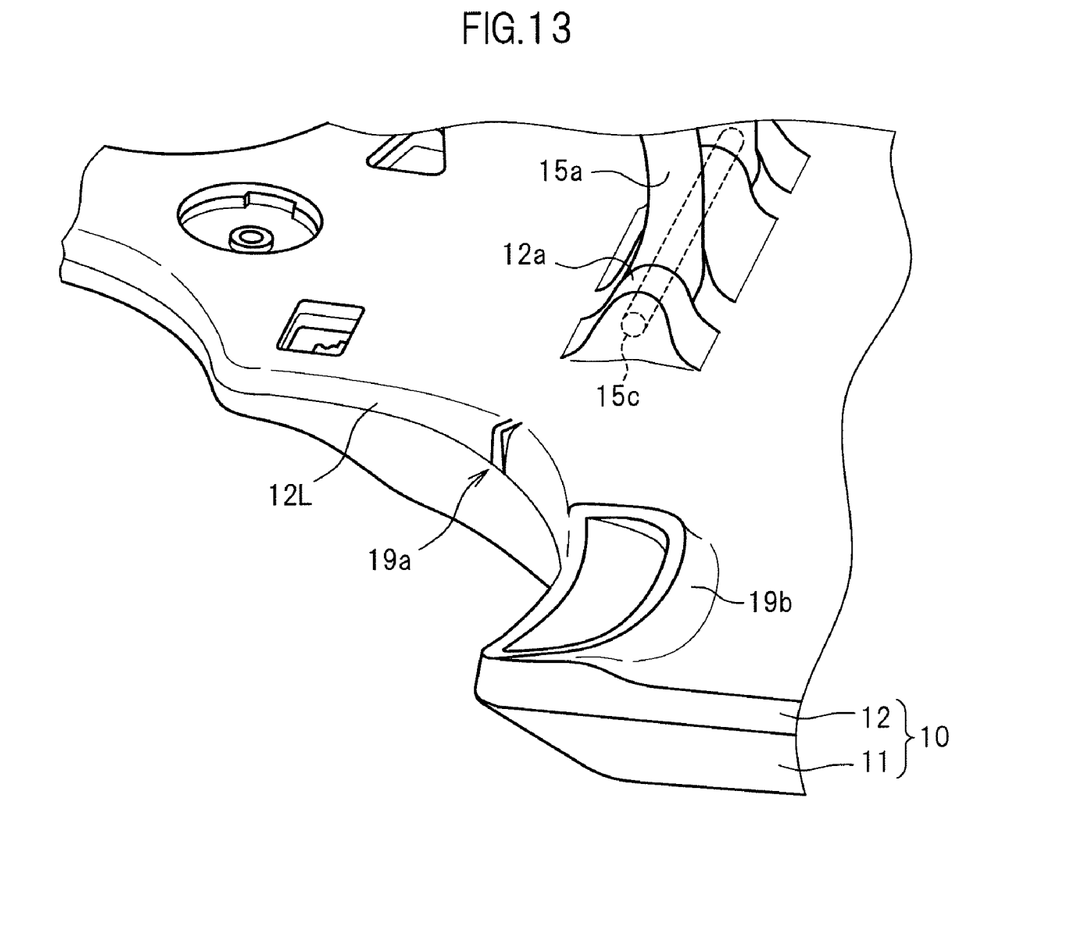
FIG. 13 is a view illustrating a shape of a rib.

Moreover, in this embodiment, there are provided ribs 19a which protrude from the partial regions of the side surface portions 12R and 12L and have shapes corresponding to such curved shapes of the side surfaces 24R and 24L. FIG. 13 is a view illustrating the shape of one of the ribs 19a. FIG. 13 illustrates a state where the body portion 10 of the key pad 1 is viewed from the lower side (back surface side). Tip end portions of the ribs 19a are brought into contact with the side surfaces 24R and 24L, as a result of which the key pad 1 becomes less likely to positionally shift with respect to the controller 2, and the key pad 1 can be prevented from shaking during use.

Further, in this embodiment, the buttons 26 provided on the rear surface of the controller 2 are provided on protruding portions of the controller 2, which protrude from the body portion thereof. In accordance with this construction, overhang portions 19b which are brought into contact with upper surfaces of the protruding portions when the key pad 1 is attached to the controller 2 are provided on the key pad 1. Specifically, as illustrated in FIG. 1B and the like, the overhang portions 19b are provided on two left and right spots of the bottom portion 12 of the key pad 1, and hang over from the bottom surface of the key pad 1 with an inclination corresponding to an inclination of upper surfaces of the protruding portions of the controller 2. The overhang portions 19b are brought into contact with the protruding portions of the controller 2 as described above, thus further preventing the key pad 1 from shaking in the up-and-down direction at the time when the user operates the keys 13 provided on the key pad 1. Further, in the state where the key pad 1 is attached to the controller 2, the overhang portions 19b hang over from the bottom surface of the key pad 1 with such a height that the upper surface of the key pad 1 inclines with respect to the upper surface of the controller 2. In such a way, it becomes easy for the user to operate the keys 13 provided on the upper surface of the key pad 1 in the state where the user grips the grip portions 20R and 20L.

As described above, the side surface portions 12R and 12L formed on the key pad 1 are brought into contact with the side surfaces 24R and 24L constituting the recessed portion 24 of the controller 2. In such a way, even if the force in the direction of pulling the body of the key pad 1 to the forward side is applied thereto at the time, when the user depresses the key 14R and the key 14L, for example, the bottom portion 12 hitches on the side surfaces 24R and 24L of the controller 2, and the key pad 1 does not positionally shift with respect to the controller 2 in the fore-and-aft direction, and so the key pad 1 can be used in a stable state. Further, both of the side surfaces 24R and 24L slant with respect to the left-and-right direction of the controller 2. Accordingly, the side surface 24R faces not only the rear side of the controller 2 but also the left side of the controller 2, and the side surface 24L faces not only the rear side of the controller 2 but also the right side of the controller 2. Therefore, even if the force is applied to the key pad 1 in the left-and-right direction thereof when the key pad 1 is used, the bottom portion 12 hitches on the side surface portion 24R or 24L, as a result of which the key pad 1 is adapted to not positionally shift with respect to the controller 2 in the left-and-right direction.

Note that the embodiment of the present invention is not limited to the embodiment described above. For example, a mechanism for moving the tip end portion of the first holding portion 15 in the direction of moving away from the second holding portion 16 and attaching the key pad 1 to the controller 2 is not limited to the above-mentioned rotation mechanism, and may be other mechanisms such as a mechanism of moving the entire first holding portion 15 in parallel to the bottom portion 12.

Further, the operation input device attached to the base is not limited to the key pad 1, and may be other types of devices used for receiving the operation inputs from the user. Moreover, the base is not limited to the controller 2, and may be other structures. Specifically, though the touch sensor 11a is provided on the key pad 1 according to this embodiment, pointing devices such as a trackball and a joystick, for example, may be provided thereon in place of or in addition to the touch sensor 11a. The pointing devices as described above are used for operation inputs for indicating directions, and accordingly, force in a direction parallel to the surface of the body of the operation input device is likely to be applied to the operation input device at the time of the operation inputs by the user. Even in the case where the devices as described above are provided, the operation input device can be suppressed from shaking with respect to the base owing to the operation input device according to this embodiment.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An operation input device to be used by being attached to a base having a surface on which a recessed portion including a side surface that faces one end of the base is formed, the operation input device comprising:
   a side surface portion, at least a part of which is formed into a shape corresponding to the side surface of the recessed portion facing the one end; and
   first and second holding portions which protrude from the operation input device so as to be opposed to each other, and fix the operation input device to the base by sandwiching the base respectively from the one end and an opposite side to the one end, wherein:
   a surface of at least one of the first and second holding portions, which is brought into contact with the base, is formed to be bent toward another one of the first and second holding portions;
   at least a tip end portion of the first holding portion is configured to be movable toward an opposite side to the second holding portion, and the tip end portion of the first holding portion moves toward the opposite side to the second holding portion, whereby the operation input device is attached to or detached from the base; and the side surface portion is brought into contact with the side surface of the recessed portion facing the one end, in a state where the operation input device is attached to the base, wherein the first holding portion is coupled to a bottom surface of the operation input device, is configured to be rotatable about a rotation shaft as a rotation center provided on a portion thereof that is coupled to the bottom surface, and has a tip end portion moving to the opposite side to the second holding portion by rotation of the first holding portion.

2. An operation input device according to claim 1, wherein the first holding portion is urged so as to rotate in a direction such that the tip end portion thereof approaches the second holding portion.

3. A character input device to be used by being attached to a base having a surface on which a recessed portion including a side surface that faces one end of the base is formed, the character input device comprising:

character inputting keys provided on a surface of the character input device;

a side surface portion, at least a part of which is formed into a shape corresponding to the side surface of the recessed portion facing the one end; and first and second holding portions which protrude from the character input device so as to be opposed to each other, and fix the character input device to the base by sandwiching the base respectively from the one end and an opposite side to the one end, wherein:

a surface of at least one of the first and second holding portions, which is brought into contact with the base, is formed to be bent toward another one of the first and second holding portions;

at least a tip end portion of the first holding portion is configured to be movable toward an opposite side to the second holding portion, and the tip end portion of the first holding portion moves toward the opposite side to the second holding portion, whereby the character input device is attached to or detached from the base; and the side surface portion is brought into contact with the side surface of the recessed portion facing the one end, in a state where the character input device is attached to the base, wherein the first holding portion is coupled to a bottom surface of the character input device, is configured to be rotatable about a rotation shaft as a rotation center provided on a portion thereof that is coupled to the bottom surface, and has a tip end portion moving to the opposite side to the second holding portion by rotation of the first holding portion.

4. An operation input device to be used by being attached to a base having a surface on which a recessed portion including a side surface that faces one end of the base is formed, the operation input device comprising:

a side surface portion, at least a part of which is formed into a shape corresponding to the side surface of the recessed portion facing the one end; and first and second holding portions which protrude from the operation input device so as to be opposed to each other, and fix the operation input device to the base by sandwiching the base respectively from the one end and an opposite side to the one end, wherein:

a surface of at least one of the first and second holding portions, which is brought into contact with the base, is formed to be bent toward another one of the first and second holding portions;

at least a tip end portion of the first holding portion is configured to be movable toward an opposite side to the second holding portion, and the tip end portion of the first holding portion moves toward the opposite side to the second holding portion, whereby the operation input device is attached to or detached from the base; and the side surface portion is brought into contact with the side surface of the recessed portion facing the one end, in a state where the operation input device is attached to the base, wherein:

a rib having a shape corresponding to a curved shape of the side surface of the recessed portion facing the one end is formed on the side surface portion in a protruding manner; and a tip end portion of the rib is brought into contact with the side surface of the recessed portion facing the one end, in the state where the operation input device is attached to the base.

* * * * *